V. H. PETERSON.
TOOL.
APPLICATION FILED FEB. 19, 1919.
1,352,688.
Patented Sept. 14, 1920.
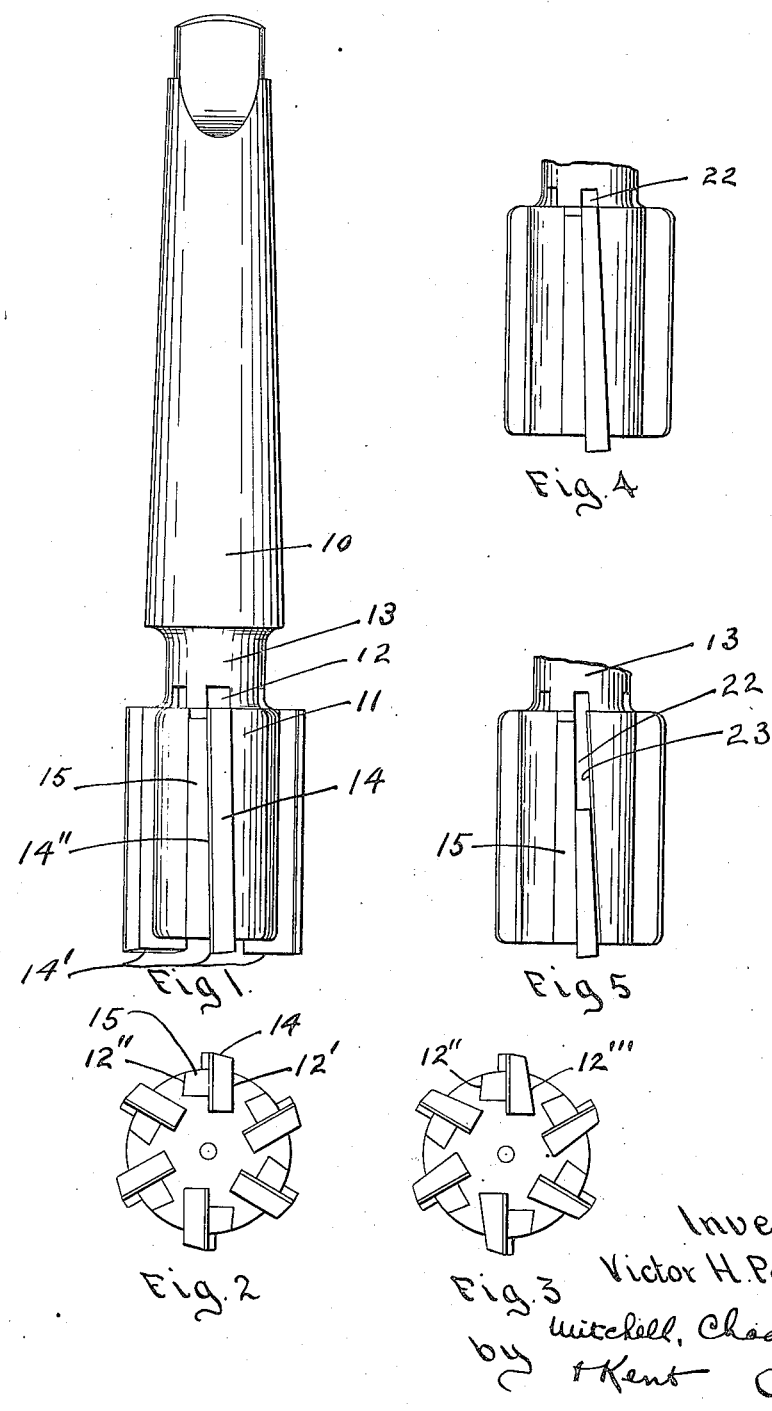
Inventor
Victor H. Peterson
by Mitchell, Chadwick & Kent
Att'ys

UNITED STATES PATENT OFFICE.

VICTOR H. PETERSON, OF WAVERLEY, MASSACHUSETTS.

TOOL.

1,352,688.　　　　　　　Specification of Letters Patent.　　Patented Sept. 14, 1920.

Application filed February 19, 1919. Serial No. 278,007.

*To all whom it may concern:*

Be it known that I, VICTOR H. PETERSON, citizen of Sweden, residing at Waverley, in the county of Middlesex and State of Massachusetts, have invented certain new and useful Improvements in Tools, of which the following is a specification.

This invention relates to improvements in milling tools and the like having removable blades. More particularly it relates to means for the economical use of high speed steel in such tools. It is, however, applicable with advantage to other materials. In an end milling tool made of one integral piece of metal the successive re-grinding of the blades at the end of the tool soon wears them down close to the head,—so that they do not project enough for use, and the life of the tool is then ended. It is among the objects of the invention to provide a milling tool which when arranged for work shall be solid and stiff, but whose blades can be removed, adjusted and re-set, projecting farther from the end, giving the tool life for a renewed succession of grindings, and into which fresh blades subsequently can be inserted, and likewise consumed. By this construction, the higher cost and the greater difficulty of working the material when the whole tool is of high speed steel is saved, and this is saved repeatedly with each re-setting. The only high speed steel required is that for the blades which have the cutting edges. It is a feature of the invention that the blade, thus removable, is secured in place by a key which interlocks with the tool holder, and whose interlocking feature is made by an extremely simple mechanical process. Another feature that may be embodied is the interlocking of the blade, produced by a similar simple means; and yet another feature is the providing of a rear abutment supporting the blade against recession in its holder, and capable of performing this function by positive means in an infinite number of gradations of position of the blade as it is moved forward for re-grinding and repeated use. Means of accomplishing these objects are shown in the illustrative embodiment of the invention set forth in the accompanying drawing and description.

It is intended that the patent shall cover, by suitable expression in the appended claims, whatever features of patentable novelty exist in the invention disclosed.

In the accompanying drawing:

Figure 1 is a side view of a complete tool embodying the invention;

Fig. 2 is an end view of the same;

Fig. 3, showing an additional feature of the invention, is an end view similar to Fig. 2;

Fig. 4, showing still another feature, is a side view of the head of the tool, arranged for clearness with one blade only projecting, the blade tapering in thickness from one end to the other; and Fig. 5 is a similar view of the same modification with said blade partly ground away as in usage, and adjusted accordingly.

Referring to the drawings, 10 indicates the shank of a tool having a head 11 in which are cut grooves 12 whose inner ends may be seen where they run into the reduced neck 13 of the tool. The tool portrayed is an end mill, holding blades 14. The cutting edges of the blades are at 14′; although these blades may also be provided with cutting edges at 14″ so as to make a side or cylindrical milling tool, if desired. Each blade is held in place by a key 15 which extends alongside of the blade, tapering in the direction of the axis, from its outer to its inner end as clearly seen in Fig. 1. It is a feature of the invention that the key also tapers radially to its outer face, that side of it which forms a part of the periphery of the cylindrical portion of the tool being smaller than its inner face or side of which extends in the direction of the axis and faces toward the center of the tool. Thus it is held in place during and after being driven in endwise, notwithstanding that the blade may while at work be subjected to powerful stresses tending to force it radially outward from its setting. The powerful compression arising by wedging the key and the blade between that surface of the groove 12 which is indicated at 12′ in Fig. 2, and that which is indicated at 12″ absolutely prevents that key from moving outward, by physical obstruction. If the restraint were left merely to friction, the key might rise a little and when driven in pull the blade out with it. But owing to the cam action of the surface whose edge is seen at 12″, the key is kept down toward the axis and at the same time the effect is by friction to move or hold the blade 14 down solidly in the groove 12.

The wall 12′ of the groove against which the blade is pressed is parallel to the central cleavage between key and blade, but this might be undercut as at 12''', Fig. 3, and the back of the blade shaped correspondingly. In that case, the conjoint effect of the groove faces 12'' and 12''' would be to hold both key and blade down toward the axis, unmovable radially.

It will be understood that in the drawing the relative dimensions of key and blade as compared with the tool head are somewhat exaggerated for clearness of showing, above the proportions that might well be used in practice.

In manufacture, both key and blade are made from bar steel, and it is a simple operation to make both the key and the blade tapering radially, with faces thus inclined, by merely tipping the bed of the grinding machine on which they are ground to fit the groove.

In operation the blades 14, being set solidly as represented in any of the figures, may be ground at their ends 14' with as great precision as if they, the keys 15, and tool head 12 and shank 11 were all of one piece of metal. However, if the tool were one integral piece of metal the projecting parts of the blades at the end of the tool would, by two or three re-grindings, be ground down so short that they could no longer be used. In the tool of the invention, when this stage is reached, the blades can be loosened, re-adjusted with the original degree of projection, made tight, and again re-ground, as if the tool were all of one piece. In this way nearly the whole length of the blade can be utilized; fresh blades can be substituted after that is used up; and the tool shank and head continue in service indefinitely.

In the forms shown in Figs. 1-3, the blades are assumed to be of uniform thickness from end to end. In such a case, they are held against endwise recession only by friction. This indeed is thought to be enough for ordinary uses to which the tool may be put; but for special solidity the blades may be made tapering endwise, as shown in Fig. 4, and the groove 22 in which each is set may taper correspondingly. In that case, when the tool is re-adjusted endwise a shim 23 may be inserted, according to the thickness needed. In using this form of the tool, there is, consequently, a solid abutment resisting endwise thrusts on the blades as well as an abutment resisting radially outward pressure either on the blade or the key. If preferred, the shim may be inserted between key and wall, or between key and blade.

I claim as my invention:—

1. A rotary cutting tool having a head with grooves extending in the general direction of the axis; blades and keys adapted to fit removably in the grooves, each key being tapered endwise and adapted to press its blade laterally toward a wall of the groove; said keys being also tapered in the radial direction with the smaller dimension outward and the groove wall being inclined to correspond.

2. A rotary cutting tool having a head with grooves extending in the general direction of the axis; blades and keys adapted to fit removably in the grooves, each key being tapered endwise and adapted to press its blade laterally toward a wall of the groove; said blades being tapered in the radial direction with the smaller dimension outward and the groove wall being inclined to correspond, fitting the blade, with a part of the groove above the bottom narrower than the base of the blade.

3. A rotary cutting tool having a head with grooves extending in the general direction of the axis; blades and keys adapted to fit removably in the grooves, each key being tapered endwise and adapted to press its blade laterally toward a wall of the groove; said blades and said keys each being tapered in the radial direction with the smaller dimension outward, and the groove walls being inclined to correspond.

4. A rotary cutting tool having a head with grooves extending in the general direction of the axis; blades and keys adapted to fit removably in the grooves, each key being tapered endwise and adapted to press its blade laterally toward a wall of the groove; one of said elements in each groove being tapered in the radial direction with the smaller dimension outward; and the groove wall being inclined to correspond; the blade being tapered endwise, and there being a shim intervening between the groove walls when the blade is seated in partly withdrawn position.

Signed at Boston, Massachusetts, this 17th day of February, 1919.

VICTOR H. PETERSON